April 19, 1938.  A. G. BUTLER  2,114,522
STEERABLE TAIL WHEEL
Filed Sept. 13, 1932   2 Sheets-Sheet 2

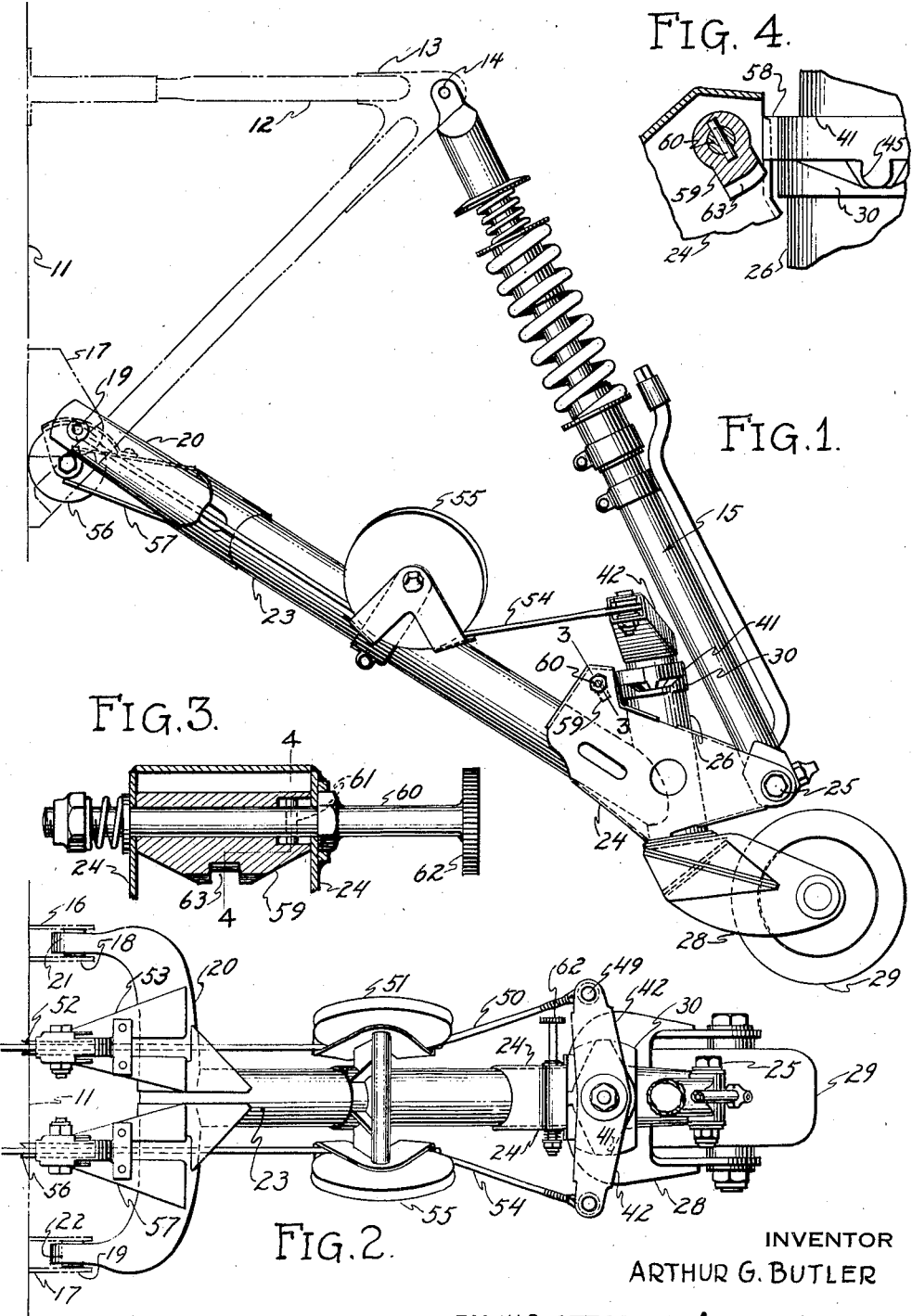

INVENTOR
ARTHUR G. BUTLER.

BY HIS ATTORNEY

Patented Apr. 19, 1938

2,114,522

UNITED STATES PATENT OFFICE 2,114,522

STEERABLE TAIL WHEEL

Arthur G. Butler, Buffalo, N. Y., assignor, by mesne assignments, to Curtiss-Wright Corporation, a corporation of New York Application September 13, 1932, Serial No. 632,903

12 Claims. (Cl. 244—109)

This invention relates to improvements in aircraft, and provides more particularly a tail chassis carrying a steerable tail wheel and support. The tail wheel support is adapted under certain circumstances to be released from the steering mechanism, whereupon it can swivel as a caster through 360° of rotation. Under other circumstances, the tail wheel support may be locked in a fixed fore and aft position.

Under the various conditions of ground maneuvering of an aircraft, all three of these functions are desirable, and particularly in aircraft adapted to land on the deck of a ship, controllability of the tail wheel is essential. In operating an aircraft equipped with my invention, in the normal function of landing and taking off, a positive steering connection is provided for the tail wheel in conjunction with the rudder controls, thus aiding in preventing the aircraft from yawing in these maneuvers. Likewise, when the aircraft is being maneuvered on the ground by the pilot, prior to taking off or after landing, the steerable feature greatly facilitates proper directional control of the aircraft. When the aircraft is being moved about on the ground, as for instance, when the aircraft is being placed in, or being taken out of, a hangar, it is highly desirable that the handling crew on the ground be able to turn the craft in any desired direction without manipulation of the tail wheel steering controls. Under such circumstances, the steering controls may be released from the tail wheel and the tail wheel may swivel as a caster, thus allowing the craft to be pushed or pulled into or out of smaller places in a hangar. When the craft is parked, as on the deck of a ship, it is desirable to lock the tail wheel in one position of adjustment, to prevent inadvertent moving of the craft by cross winds or by the rolling action of a ship deck.

In the past, tail chassis for aircraft have been made in steerable form, have been so constructed that they can swivel, or have been constructed so that they maintain a single position of adjustment, but the combination of the three functions in a single unit has not, to the knowledge of applicant, been accomplished heretofore.

An object of the invention is to provide a ground contact element in a tail chassis for aircraft which may be steered by an occupant of the aircraft, or may be optionally released for swivel action independently of the steering controls.

A further object of the invention is to provide means for locking the ground contact element of the tail chassis in a fixed position of adjustment.

A further object of the invention is to provide suitable mechanism, simple in operation and light in weight, able to accomplish the above named objects.

A further object is to provide a steerable tail chassis equipped with shock absorbing devices, and in which the steering action is not affected by changes in the position of the ground contact element with respect to the aircraft, as the result of extension or compression of the shock absorbing device.

Further objects will be apparent from a reading of the subjoined specification and claims, and from a consideration of the accompanying drawings.

To more clearly explain my invention, an embodiment thereof is shown in the attached drawings, in which similar numbers indicate similar parts, and in which:

Fig. 1 is a side elevation of an aircraft tail chassis;

Fig. 2 is a plan of the tail chassis of Fig. 1;

Fig. 3 is a section on the line 3—3 of Fig. 1;

Fig. 4 is a section on the line 4—4 of Fig. 3;

Figure 5:
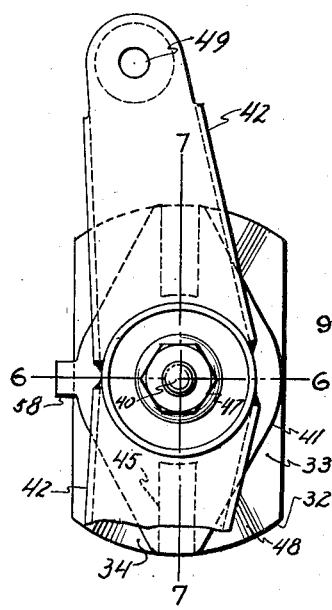
Fig. 5 is an enlarged portion of Fig. 2.
Figure 7:
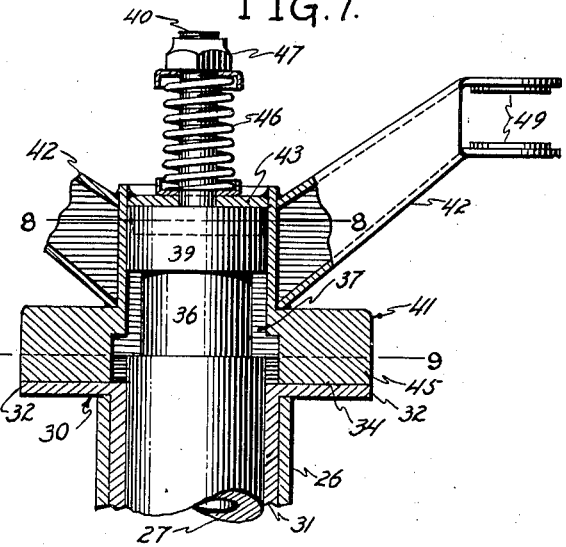
Fig. 7 is a section on the line 7—7 of Fig. 5.
Figure 8:
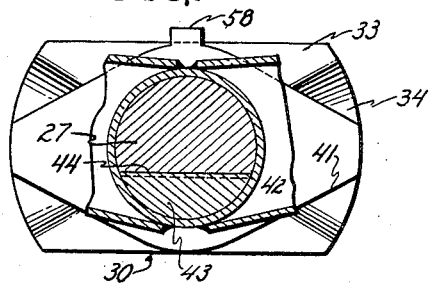
Fig. 8 is a section on the line 8—8 of Fig. 7.
Figure 6:
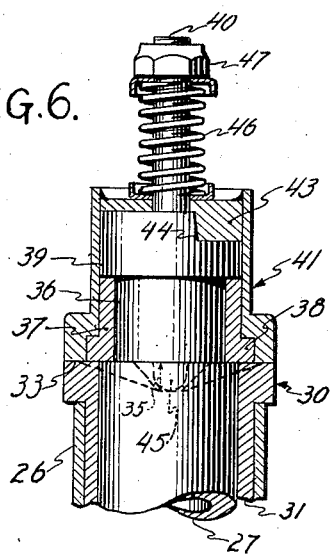
Fig. 6 is a section on the line 6—6 of Fig. 5.
Figure 9:
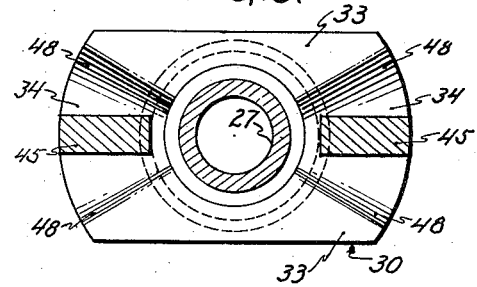
Fig. 9 is a section on the line 9—9 of Fig. 7.

Referring to Fig. 1, 11 represents the rearward portion of the fuselage of an airplane, to which is rigidly attached a triangulated bracket 12. In an upper plate 13 of the bracket 12 is formed a pivot 14 to which a shock absorbing strut 15 is attached for oscillation in a vertical plane. On the rearward end of the fuselage 11 are attached a pair of brackets 16 and 17, in horizontally spaced relation. In the brackets 16 and 17 are formed openings 18 and 19 in axial alinement. A yoke 20 is provided with an end 21 adapted to lie adjacent the opening 18 of the bracket 16 and to be pivoted thereto. Similarly, an end 22 of the yoke 20 is adapted to lie adjacent the opening 19 of the bracket 17 and is pivoted thereto. By the pivoting of the ends 21 and 22, the yoke 20 is allowed to oscillate in a substantially vertical plane with respect to the fuselage 11. Toward the center of the yoke 20, between the brackets 16 and 17, a rearwardly extending member 23 is rigidly attached. This member 23 is provided at its rearward end with bracket plates 24 adapted to be pivoted at their rearward ends as at 25 to the lower end of the shock absorbing strut 15. Fixed toward the rearward end of the member 23, but forward of the pivot 25, is a substantially vertical bearing sleeve 26 into which is inserted a support 27 (shown in Figs. 6 and 7). Attached at the lower end of the support 27 is a tail wheel fork 28 carrying a tail wheel 29 for rotation and for ground contact.

The bearing sleeve 26 carries a cam 30 at its upper end, the cam 30 being provided with a bushing portion 31 adapted to set tightly within the bearing sleeve 26, and to hold the upper end of the support 27 for rotation. The cam 30 is provided with an upper portion 32 extending laterally outward and substantially horizontally over the upper edges of the bearing sleeve 26. The upper portion 32 of the cam 30 has substantially flat portions 33 forwardly and rearwardly of the axis of the support 27, and laterally of said axis, tapered depressions 34 are formed, these depressions extending radially from the axis of the support 27, and the lowermost portions of the depressions 34 are a substantial distance, designated as 35, below the flat portions 33.

The support 27 extends through the bearing sleeve 26 and retains a constant diameter to the plane of the flat portions 33 of the cam 30, above which plane a reduction in diameter of the support 27 is effected to form a bearing surface 36. A split bushing 37 having a shoulder 38 formed at its lower end, is adapted to embrace the bearing surface 36 of the support 27, and its shoulder 38 bears on the flat portions 33 of the cam 30, thus holding the support 27 within the bearing sleeve 26. Above the bearing surface 36, the diameter of the support 27 is again increased as at 39 to substantially the same diameter as the support 27 where it passes through the bearing sleeve 26. Extending centrally and upwardly from the top of the support 27, is a threaded bolt 40, the purpose of which will be later described.

A steering member 41, provided with steering levers 42, is adapted to fit over the upper end of the support 27 and is adapted to turn with or with respect to the support 27 in a manner hereinafter to be described. Attached to the upper portion of the steering member 41 is a dog 43 adapted to engage a recess 44 formed in the upper end of the support 27. The steering member 41 extends downwardly around the upper end of the support 27, holding the split bushing 37 in position. The lower end of the steering member 41 is provided with laterally extending cam engaging projections 45, these projections 45 being adapted to engage either the depressed portion 34 or the flat portion 33 of the cam 30, according to the position of the steering member 41 with respect to the bearing sleeve 26.

A spring 46 is passed over the bolt 40, bearing at its lower end against the dog 43 of the steering member 41 and being retained in a compressed condition by means of a nut 47 screwed down on the bolt 40.

By means of the parts above described, it will be seen that the steering levers 42, acting through the dog 43 while engaging the recess 44, may effect turning of the support 27 and consequently of the tail wheel fork 28 and the tail wheel 29, thus establishing steerability of the tail wheel. As the steering levers 42 are moved from a lateral line, the cam engaging projections 45 engage a sloping portion 48 between the portions 34 and 33 of the cam 30, and as turning of the steering levers 42 is continued, the steering member 41 carrying the dog 43, is raised with respect to the cam 30 and with respect to the recess 44 of the support 27. Continuation of the turning motion finally raises the dog 43 until it no longer engages the recess 44, whereupon an effective steering connection between the steering levers 42 and the support 27 is broken. The shape of the cam 30 is so organized that breaking of the steering connection only occurs at extreme positions of adjustment of the steering levers 42.

As long as the steering levers 42 are retained in either extreme position of adjustment, the dog 43 will be raised from the recess 44 and the support 27 is free to rotate in the bearing sleeve 26. When the steering levers 42 are moved to a substantially lateral attitude, the dog 43, being pressed downwardly by the spring 46, may engage the recess 44 to re-establish the steering connection upon rotation of the support 27 to a position where such engagement can take place.

The end 49 of one steering lever 42 is connected by a cable 50 to suitable control means (not shown) within the aircraft. Means for guiding the cable 50 is supplied by the pulley 51 mounted for rotation on the member 23, and the cable 50 is also passed over a pulley 52 mounted for rotation on a bracket 53 attached to the yoke 20. The bracket 53 is so located that the upper periphery of the pulley 52 lies substantially on the axis of the yoke pivots 18 and 19. Another cable 54 is attached to the other steering lever 42, the cable 54 passing under a pulley 55 attached to the member 23, and over a pulley 56 mounted for rotation in a bracket 57 attached to the yoke 20. The bracket 57 is also arranged so that the upper periphery of the pulley 56 lies on the axis of the pivots 18 and 19. The cable then passes to the control device within the aircraft. By this arrangement of pulleys, the control cables 50 and 54 are articulated on the axis of oscillation of the member 23, so that steering action may properly take place without undue slackening or tightening of the cables 50 and 54, regardless of the position of adjustment of the member 23 with respect to the aircraft. The member 23 is adapted by its connection with the shock absorbing strut 15 to oscillate in a vertical plane as it reacts to rough ground over which the aircraft as a whole may travel, and by the cable arrangement, steering may be effected regardless of the terrain over which the aircraft may be traveling.

The control device within the aircraft (not shown) to which the cables 50 and 54 are attached is usually part of the air rudder control system, and normally the steering mechanism for the tail wheel support 27 is coordinated with the steering mechanism for the rudder. Hence, upon moving the rudder control—or the rudder, itself—to either the extreme right or left position, the steering levers 42 are also moved to an extreme position of adjustment and release the tail wheel support 27 for swiveling, as has been heretofore described, thus facilitating pushing of the ship by the ground crew.

A manually operated locking device, shown in detail in Figs. 3 and 4, is coordinated with the member 23 and the steering member 41 for locking the tail wheel support 27 in a fixed fore and aft direction. In detail, the steering member 41 is provided at its forward side with a lug 58. A locking block 59, fixed to a shaft 60 by a key 61, is adapted to be rotated with respect to the bracket plates 24 in which it is mounted by means of a handle 62 at one end of the shaft 60. The locking block 59 is provided at one side thereof with a notch 63 which is engageable with the lug 58 on the steering member 41 upon rotation of the handle 62. When this notch 63 engages the lug 58, rotation of the steering member 41 with respect to the bearing sleeve 26 and the member 23, is prevented, thus locking the tail wheel as a whole in a fixed fore and aft position. The only condition under which it might be desirable to lock the tail wheel in a fixed fore and aft position would be when the aircraft is parked on a ship deck or landing field. Hence, the locking mechanism is manually controlled at the tail chassis and it is unnecessary that this should be controlled from the cockpit of the aircraft. Unlocking is effected by turning the handle 62 to disengage the notch 63 from the lug 58.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In tail chassis for aircraft, a bearing, a support journalled in said bearing, a device for ground contact carried by said support, a lever pivoted to said support and movable longitudinally with respect thereto, and means for releasably engaging said lever with said support responsive to longitudinal movement of said lever.

2. In tail chassis for aircraft, a wheel support, a bearing in which said support is adapted to rotate freely, a cam fixed with respect to said bearing, a lever rotatable either with or with respect to said support, cam engaging means carried by said lever, resilient means for urging said cam engaging means into engagement with said cam, and mutually engageable locking means carried respectively by said support and lever, lockable in response to disengagement of said cam and cam-engaging means.

3. In tail chassis for aircraft, a tail wheel support, a lever, a control device within said aircraft, connections from said control device to said lever, disengageable means carried by said support for locking said lever thereto, and cam elements carried by said lever and aircraft engageable upon extreme movement of said lever to unlock said means from said lever.

4. In tail chassis for aircraft, a normally steerable tail wheel, a control device therefor, and means operated by extreme movement of said control device for releasing said tail wheel from said device for allowing swinging thereof through approximately 360°, said means including cam elements on said aircraft and control device, respectively, engageable with each other upon movement of said control device beyond a predetermined limit of movement.

5. In tail chassis for aircraft, a tail wheel support, a member in which said support is journalled, a lever carried by said support, means for locking said lever to said support, and a device operated by movement of said lever for engaging and disengaging said locking means with said support.

6. In tail chassis for aircraft, a tail wheel support arranged for rotation through approximately 360° with respect to said aircraft, a member in which said support is journalled, a cam carried by said member, a dog carried by said support, a lever pivoted to said support and having formed thereon means for engaging said cam, said lever being adapted to slide longitudinally along its pivot upon engagement of said cam with said cam-engaging means, and said lever having formed thereon dog-engaging means adapted normally to engage said dog and adapted to disengage said dog upon longitudinal sliding of said lever with respect to said support.

7. In tail chassis for aircraft, a tail wheel support, a member in which said support is journalled, a cam carried by said member, a dog carried by said support, a lever having engaging means for said cam and for said dog, said means being adapted to disengage said dog upon engagement thereof with said cam.

8. In tail chassis for aircraft, a normally steerable tail wheel, a control device therefor, and means operated by extreme movement of said control device for releasing said tail wheel from said device, said means including cam devices on said aircraft and control device respectively, engageable after predetermined movement of said control device for allowing free swinging of said tail wheel.

9. In aircraft, a swiveling tail chassis, means for steering said chassis, a releasable driving connection between said means and chassis, and elements on said aircraft and on said means contactable upon extreme movement of said means for releasing said driving connection.

10. In tail chassis for aircraft, a member, a support journaled therein, a control device pivoted to said support and movable longitudinally with respect thereto, and means for releasably engaging said control device with said support, responsive to longitudinal movement of said control device along the axis of said pivot.

11. In tail chassis for aircraft, a support journaled therein, a control device movable with and with respect to said support, means for locking said device to said support, and means carried respectively by said control device and aircraft engageable upon certain movements of said device, for disengaging said locking means.

12. In aircraft, a swiveling tail chassis, means for steering said chassis through limited angles, and mechanism including cam elements on said aircraft and on said means respectively for disconnecting said means from said tail chassis, engageable by movement of said steering means to extreme positions of adjustment for disconnecting said steering means from said chassis.

ARTHUR G. BUTLER.